Oct. 17, 1967            C. J. WHEELER            3,346,953
MULTIPLE SECTIONAL PIPE CUTTER WITH THE CUTTING
TEETH EXTENDING IN OPPOSITE DIRECTIONS
Filed Aug. 18, 1965
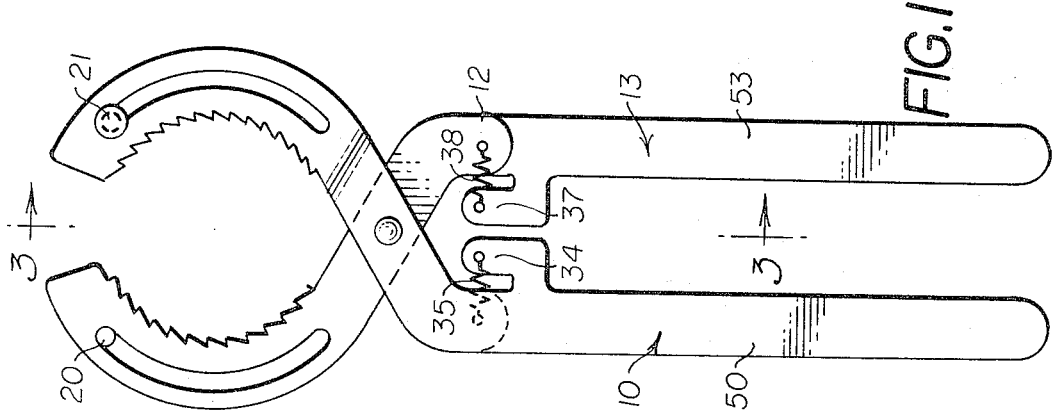
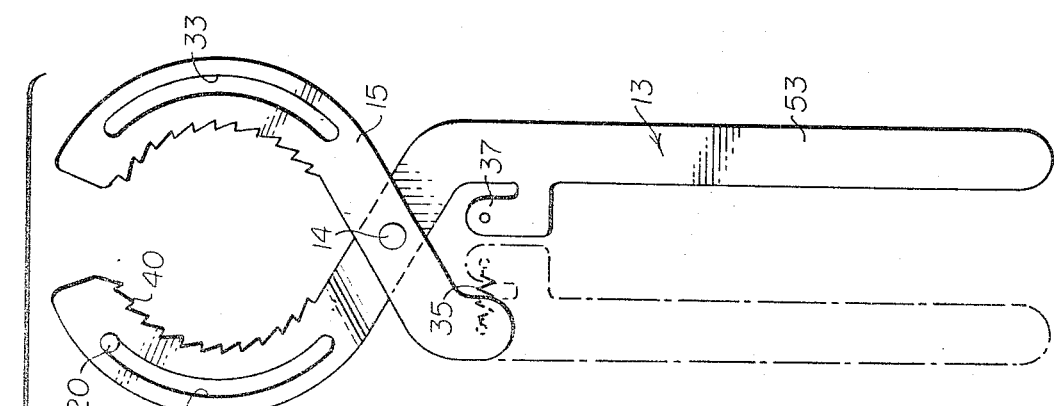
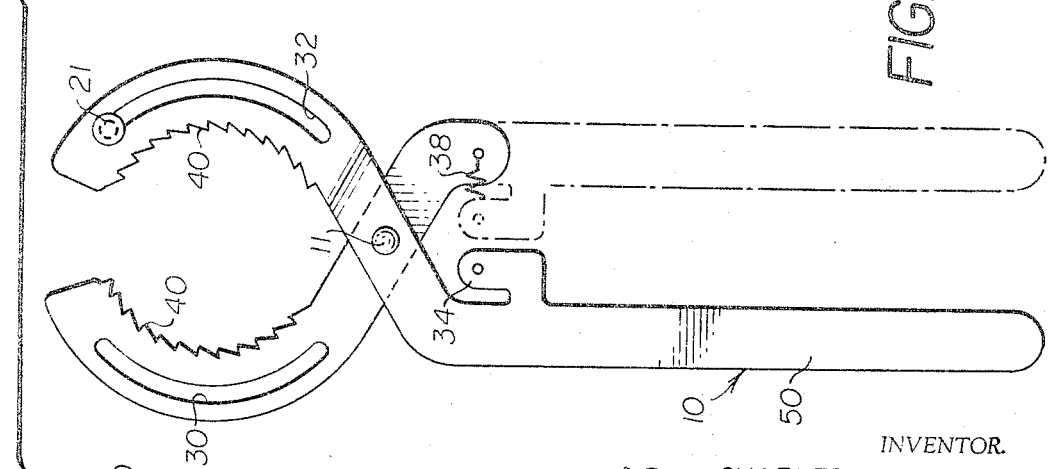
INVENTOR.
CHARLES J. WHEELER
BY *Watts & Fisher, attys.*

3,346,953
MULTIPLE SECTIONAL PIPE CUTTER WITH THE CUTTING TEETH EXTENDING IN OPPOSITE DIRECTIONS
Charles J. Wheeler, RFD. 2, Box W-23, Burton, Ohio 44021
Filed Aug. 18, 1965, Ser. No. 480,575
6 Claims. (Cl. 30—95)

This invention relates to cutters and more particularly to cutters for tubing such as copper tubing and the like.

In the typical tube cutter, a C-shaped body member is provided. Tube engaging rollers are mounted on the C-shaped member. A circular cutter wheel is mounted on the body member opposite the rollers. A means is provided to urge the cutter inwardly into cutting compressive engagement with the tubing. Typically, the body member is rotated around the tubing as the cutter wheel rotatively and forceably engages the tube. The cutter is gradually moved inwardly until the tubing has been severed.

This type of cutter has several disadvantages. Notably, a considerable amount of clearance is required so that the cutter can be rotated around and around the tubing. It is for example very difficult to cut copper tubing when it is in place forming part of a plumbing system. In many situations, such as when the tubing is near the ceiling or the like, it is impossible to cut the tubing with this described and typical type of cutter. In that situation, the plumber has little choice but to use a hack saw, hacksaw blade or similar implement. In such a circumstance the resulting cut will be rough, usually uneven, and may well cause difficulty, because of its skew condition and burrs and the like, in subsequent soft soldering operations.

Another shortcoming of prior cutters is that it is usually necessary, if a quality joint is to be made, to ream the end of a cut tube. This is true because the typical cut results in an inwardly deformed lip which interferes with complete efficiency of a plumbing system. Another disadvantage of the prior art cutters is the time required to effect a cut. It is necessary to rotate the cutter around and around the pipe gradually shifting the cutter wheel inwardly until a cut is finally effected. This is a relatively slow operation.

The present invention contemplates the use of pairs of cutter blades each made up of a plurality of sections. Each cutter blade section is positioned immediately adjacent a coacting cutter blade section. The blades are caused to counterrotate as they are closed on the tubing. A very quick and efficient cut is effected by this simultaneous closing and counterrotating action. The closing and counterrotating action is, in the disclosed embodiment, effected with a pair of handles. Thus, the operation of the cutting tool is not unlike closing a pair of pliers and for this reason cutting can be effected in very confined spaces as compared with prior art devices.

Accordingly, the objects of the invention are to provide a novel apparatus for effecting such cutting.

Other objects and a fuller understanding of the invention may be had by referring to the following description and claims taken in conjunction with the accompanying drawing in which:

FIGURE 1 is a top plan view of one embodiment of this invention;

FIGURE 2 is an exploded view of the device of FIGURE 1; and,

FIGURE 3 is a sectioned view of the device of FIGURE 1 as seen from the plane indicated by the line 3—3 of FIGURE 1.

Referring now to the drawings and to FIGURES 1 and 2 in particular, a handled cutter 10 is provided. The handled cutter 10 is pivotally connected at 11 to a stub cutter 12. A second handled cutter 13 is provided. The second handled cutter 13 is pivotally connected at 14 to a second stub cutter 15. Thus the handled cutter 10 and the stub cutter 12 form a first sub-assembly while the handled and stub cutter 13, 15 form a second sub-assembly to the right in FIGURE 2.

Each of these cutters has an arcuate groove formed in it. Thus, the stub cutter 12 has an arcuate groove 30 which aligns with an arcuate groove 31 in the handled cutter 13. A rivet 20 projects through the arcuate grooves 30, 31 holding the cutters 12, 13 in juxtaposed, relatively rotatable position. Similarly, the handled cutter 10 has an arcuate groove 32 and the stub cutter 15, an aligned arcuate groove 33. A second rivet 21 extends through the grooves 32, 33 holding the cutters 10, 15 in juxtaposed, relatively rotatable position.

The handle 10 has an inwardly extending spring extension 34. A spring 35 connects the extension 34 with the stub cutter 15. Similarly, the handle cutter 13 has an extension 37 to which a spring 38 is connected. The spring 38 extends from the extension 37 to the stub jaw 12.

Each of the cutters is equipped with teeth 40. As an examination of FIGURE 2 will show the teeth 40 of the juxtaposed cutters are oppositely oriented. Thus, the teeth 40 on the cutter 12 are circumferentially oriented opposite from the orientation of the teeth 40 on the cutter 13 so that as the cutter blades counterrotate an effective cut will be obtained. Further, as will be seen in FIGURE 3, these teeth 40 are in a close side-by-side juxtaposition so that upon counterrotation they provide a knife-like side-by-side counter cutting action.

When handle portions 50, 53 of the handled cutters 10, 13 are pulled apart, the cutters are caused to open to the position shown in FIGURES 1 and 2. At this juncture, a tube can be inserted between the cutters. As the handle portions 50, 53 are forced together, a compound action occurs. The springs 35, 38 draw the stub cutters with the handled cutters. Since the stub and handle cutters are riveted together in the manner which has been described, all cutters tend to close on the tube. Simultaneously, the closing force tends to cause each of the handled cutters to rotate about the tube. Since the stub cutter riveted to each handle cutter is pivotally connected to the other handled cutter, each stub cutter rotates in a direction opposite the immediately juxtaposed handled cutter. Thus, as viewed in the drawings, that portion of the cutter seen at the right hand of FIGURE 2, the handled cutter 13 and the stub cutter 15, will rotate clockwise while that portion seen at the left, the handled cutter 10 and the stub cutter 12, will rotate counterclockwise simultaneously with the closing movement. The simultaneous closing and cutting action of the juxtaposed blades causes a quick, even cut in the tube.

From this it can be seen that the cutters 13, 15 form a first sectioned blade while the cutters 10, 12 form a second sectioned blade in close juxtaposed relation to the first. In the process of cutting, the two blades are closed while simultaneously counterrotating so as to effect the cut.

Although the invention has been described in its preferred form with a certain degree of particularity, it is understood that the present disclosure of the preferred form has been made only by way of example and that numerous changes in the details of parts may be resorted to without departing from the spirit and the scope of the invention as hereinafter claimed.

What is claimed is:
1. A cutter for tubing comprising:
 (a) first and second sectioned cutters, the sections of each cutter being connected together for relative closing movement;

(b) means connected to the sections for causing such closing movements; and, (c) means interconnecting the cutters to maintain each section of one cutter in juxtaposed close relationship to a corresponding section of the other cutter whereby on closing movement of the cutter sections, each section of the one cutter and the corresponding section of the other cutter are maintained in sufficiently close relationship to simultaneously effect cutting action in a single cut through a workpiece.

2. The device of claim 1 wherein the means interconnecting the cutters are arcuate.

3. The cutters are toothed and the teeth on juxtaposed cutters are oppositely oriented.

4. A tube cutter comprising:
(a) first and second sub-assemblies;
(b) each sub-assembly including a handled cutter and a stub cutter pivotally connected to the handled cutter;
(c) arcuate means connecting the stub cutter of one sub-assembly to the handled cutter of the other sub-assembly in closed juxtaposed relation whereby to cause counterrotation of the blades on relative closing movement and whereby on closing movement the stub cutter of each sub-assembly section cutter and the handled cutter of the other are maintained in sufficiently close relationship to simultaneously effect cutting action in a single cut through a workpiece; and,
(d) first and second springs each connecting the stub cutter of one sub-assembly to the handled cutter of the other sub-assembly.

5. A tube cutter comprising:
(a) first and second sub-assemblies;
(b) each sub-assembly including a handled cutter and a stub cutter pivotally connected to the handled cutter; and,
(c) said sub-assemblies including coacting means connecting the stub cutter of one sub-assembly to the handled cutter of the other sub-assembly in closed juxtaposed relation and causing counterrotation of the blades on relative closing movement and whereby on closing movement the stub cutter of each sub-assembly section cutter and the handled cutter of the other are maintained in sufficiently close relationship to simultaneously effect cutting action in a single cut through a workpiece.

6. In a mechanism for cutting a tubular workpiece or the like:
(a) first and second cutters;
(b) means connected to the cutters to cause closing movement on a workpiece and to cause movement of the cutters in opposite directions of rotation relative to the workpiece; and,
(c) structure connected to the cutters and maintaining them in side-by-side, juxtaposed relationship whereby on closing movement of the cutters, they are maintained in sufficiently close relationship to simultaneously effect cutting action in a single cut through a workpiece.

References Cited

UNITED STATES PATENTS

| | | | |
|---|---|---|---|
| 338,716 | 3/1886 | Conner | 30—102 |
| 410,606 | 9/1889 | Patton | 30—94 X |
| 647,685 | 4/1900 | Stewart | 30—101 X |
| 666,950 | 1/1901 | Wirl | 30—102 X |
| 915,491 | 3/1909 | Shaw et al. | 30—252 |
| 1,195,591 | 8/1916 | Kammer | 30—94 |
| 2,455,009 | 11/1948 | Hood | 30—251 |
| 2,961,765 | 11/1960 | Brooks | 30—102 |

WILLIAM FELDMAN, *Primary Examiner.*

MYRON C. KRUSE, *Examiner.*